US006639793B2

(12) United States Patent
Lien et al.

(10) Patent No.: US 6,639,793 B2
(45) Date of Patent: Oct. 28, 2003

(54) VIDEO/AUDIO MODULE FOR A FLAT-PANEL DISPLAY

(75) Inventors: Fung-Kuo Lien, Taipei Hsien (TW); Chin-Yuan Lin, Sanchung (TW); Yuan-Hsing Hung, Taipei (TW); Tsan-Jung Chen, Taipei (TW)

(73) Assignee: Chuntex Electronic Co., Ltd., Taipei Hsien (TW)

( * ) Notice: Subject to any disclaimer, the term of this patent is extended or adjusted under 35 U.S.C. 154(b) by 165 days.

(21) Appl. No.: 10/007,183

(22) Filed: Oct. 19, 2001

(65) Prior Publication Data

US 2003/0076655 A1 Apr. 24, 2003

(51) Int. Cl.[7] .................................................. G06F 9/00
(52) U.S. Cl. .................. 361/686; 361/683; 361/686; 345/905; 248/346.06; 312/351.2
(58) Field of Search .............................. 361/683, 686, 361/681–682, 724–726; 345/87, 905, 903, 169; 248/917, 929, 924, 346.06, 349.1, 910, 918–923, 183.2, 398; 312/351.2, 7.2, 242, 245; 439/541.5, 540.1, 607, 701, 79, 752; 381/87, 88, 306, 309, 333, 386

(56) References Cited

U.S. PATENT DOCUMENTS 5,604,663 A  *  2/1997  Shin et al. ................... 361/686
5,825,617 A  * 10/1998  Kochis et al. ............... 361/686
5,978,211 A  * 11/1999  Hong .......................... 361/683
6,032,918 A  *  3/2000  Cho ............................ 248/688
6,411,271 B1 *  6/2002  Bang et al. .................... 345/87
6,421,235 B2 *  7/2002  Ditzik ......................... 361/683
6,466,278 B1 * 10/2002  Harrison et al. ............ 348/836
6,561,847 B1 *  5/2003  Xiang et al. .............. 439/541.5
2001/0022719 A1 *  9/2001  Armitage et al.

FOREIGN PATENT DOCUMENTS

JP          409006250 A  *  1/1997   ............. G06F/9/00

* cited by examiner

Primary Examiner—Michael Datskovsky
(74) Attorney, Agent, or Firm—William E. Pelton, Esq.

(57) ABSTRACT

A video/audio module for a flat-panel display has a rectangular housing, a circuit board and speakers provided inside the housing, and a cover enclosing the housing. Two fasteners are arranged at opposite sides of the housing, and at least one tenon is formed on the cover. Both the fasteners and the tenon are used for providing a secure connection between the module and the flat-panel display. Further, the circuit board inside the housing is able to receive external video and audio signals and then play those signals respectively by the flat-panel display and the speakers.

14 Claims, 5 Drawing Sheets

VIDEO/AUDIO MODULE FOR A FLAT-PANEL DISPLAY

BACKGROUND OF THE INVENTION

1. Field of Invention

The invention relates to a video/audio module for a flat-panel display, and more particularly to a video/audio module that has simple mechanisms for securely equipping to the monitor, meanwhile the module is able to receive external video/audio signals and to display those signals by the monitor.

2. Related Art

In accordance with the increasing popularity of multimedia peripheral equipment of personal computers, the original dull expression form of data or information in the computer has changed. For example, the original text displaying mode is replaced with a multimedia displaying mode by cooperating with various video/audio devices.

Usually, the monitor is used as an image displaying apparatus, and the speakers are for providing sounds, but how to integrate the monitor and the speakers into a single multi-function apparatus is always a point that people want to improve.

Installing two speakers respectively at two opposite sides of a monitor is a general technique for integrating the monitor and the speakers, whereby the user does not need to purchase the speakers and the monitor individually. However, such a general technique is only suitable for a conventional cathode ray tube (CRT) monitor, not for a flat-panel display. Furthermore, once the speakers or the monitor are damaged, it is difficult to repair or replace them.

For a flat-panel display apparatus, such as a liquid crystal display (LCD) monitor, equipping it with an external video/audio module for playing sounds and receiving external video signals is a common way to integrate the speakers and the monitor. The conventional video/audio module has complex mechanisms to connect with the monitor, however the production cost of the video/audio module is extremely high. On the other hand, the conventional video/audio module is only provided with metal points to electrically connect with the monitor to form a signal communication between the module and monitor, and there is no extra auxiliary means to enhance the stability of the electrical connection when the module is equipped to the monitor. Such an unstable connection easily causes interference such as feedback in the speakers installed inside the module.

To overcome the shortcomings, the present invention tends to provide a video/audio module for a flat-panel display so as to mitigate and obviate the aforementioned problems.

SUMMARY OF THE INVENTION

An objective of the invention is to provide a video/audio module for equipping a flat-panel display, the module has simple mechanisms to securely connect with the monitor, and also provides a stable electrical communication between itself and the monitor. The video/audio module is further able to receive external video or audio signals and then displays those signals by the monitor or speakers that are installed in the module.

Other objects, advantages and novel features of the invention will become more apparent from the following detailed description when taken in conjunction with the accompanying drawings.

DETAILED DESCRIPTION OF THE INVENTION

Figure 1:
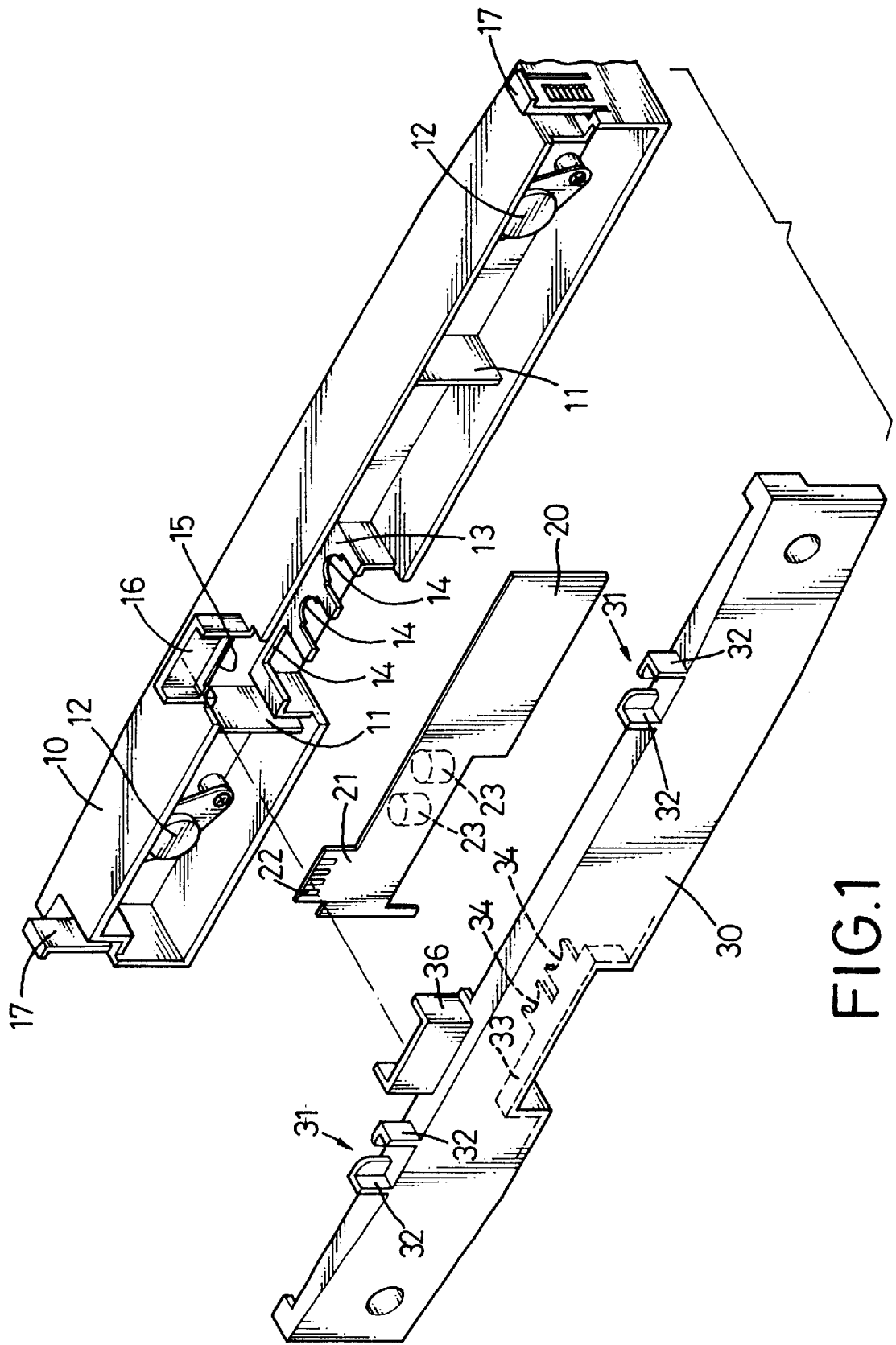
FIG. 1 is an exploded perspective view of a video/audio module in accordance with the present invention.

With reference to FIG. 1, a video/audio module of the present invention comprises a housing (10) formed as a substantially rectangular shape, a circuit board (20) arranged in the housing (10) and a cover (30) enclosing the housing (10).

Two partition plates (11) are placed in the housing (10) to divide the housing (10) into three chambers, wherein the central chamber is used for receiving the circuit board (20) and the remaining chambers are respectively for receiving one of two speakers (12).

A first platform (13) upwardly extends from a bottom plate of the central chamber, wherein multiple first notches (14) are defined in the first platform (13). A rectangular opening (15) is further defined in a top plate of the central chamber, and a first bulge (16) with a U-shaped cross-section upwardly extends from the top plate and is formed along a flange of the opening (15). Two L-shaped fasteners (17) are respectively formed at two side walls of the housing (10).

The shape of the circuit board (20) is formed to match the shape of the central chamber of the housing (10), so that the circuit board (20) is able to be received in the central chamber. At a top flange of the circuit board (20), a connecting port (21) is formed and extends upwardly therefrom, wherein the connecting port (21) has a plurality metal contacts (22) provided thereon to form a finger connector. The circuit board (20) further has many electrical elements (not shown) electrically arranged thereon on, wherein signal terminals (23) for receiving external video/audio signals are also disposed on the circuit board (20).

The appearance of the cover (30) is designed to correspond to the housing (10) so as to enclose the housing (10). The cover (30) comprises two tenons (31) formed on a top plane of the cover (30), wherein each tenon (13) is made up of two protrusions (32) that have an L-shaped cross-section, and the two protrusions (32) are arranged oppositely to form a substantially U-shape tenon (31). A second bulge (36) corresponding to the first bulge (16) is also formed on the top plane of the cover (30), and a second platform (33) corresponding to the first platform (13) is formed at the cover (30), wherein the second platform (30) is defined with multiple second notches (34) to correspond to the first notches (14) of the housing (10).

Figure 2:
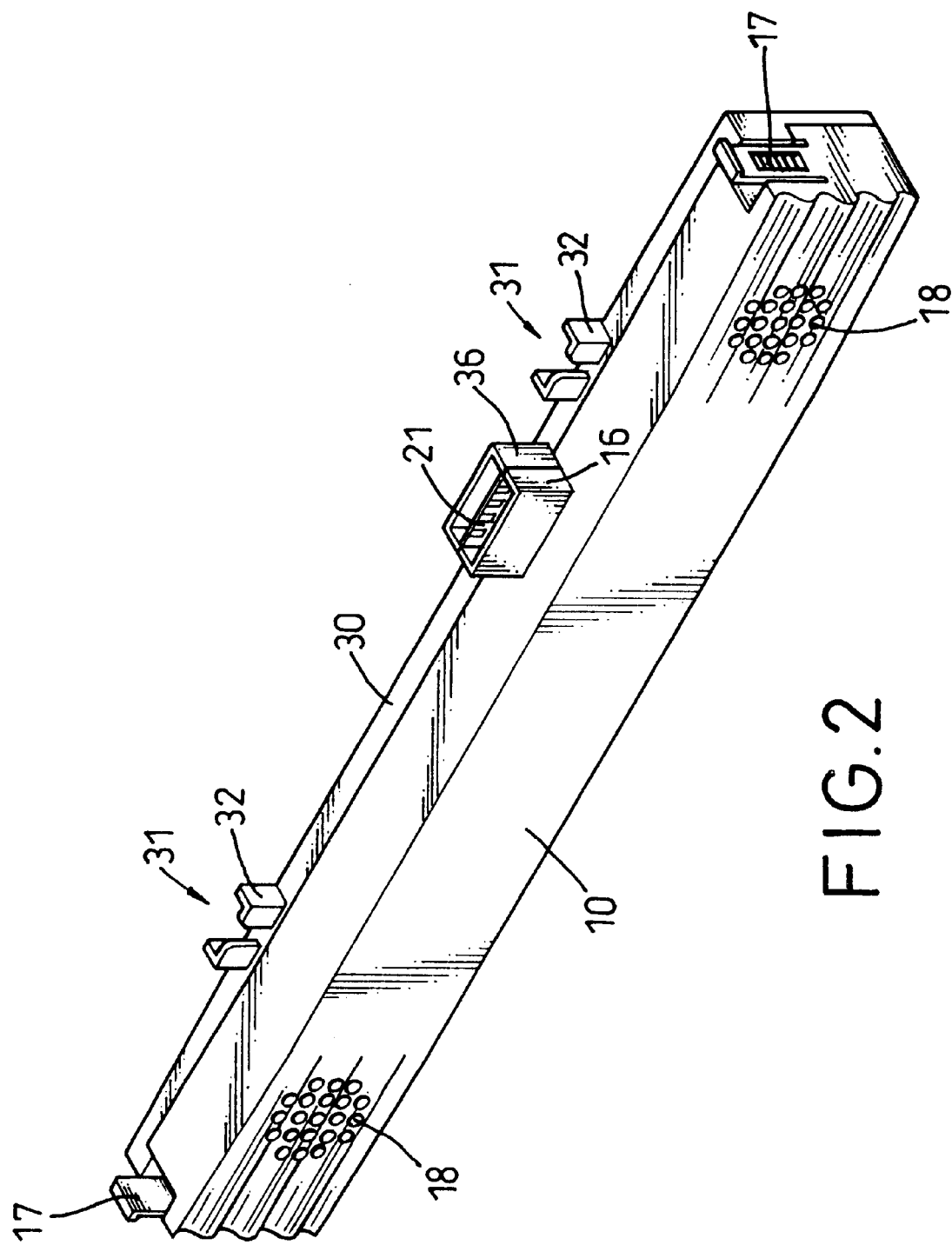
FIG. 2. is a perspective view showing the video/audio module of FIG. 1 being assembled in an opposite direction.

With reference to FIGS. 1 and 2, the circuit board (20) is placed in the central chamber of the housing (10) and securely screwed therein, wherein the two speakers (12) are electrically connected to the circuit board (20) via wires (not shown) to achieve the signal communication, so that the circuit board (20) is able to drive the speakers (12) to output sounds. Meanwhile, the connecting port (21) of the circuit board (20) protrudes from the rectangular opening (15).

Then the cover (30) is disposed to cover the housing (10), whereby the first bulge (16) and the second bulge (36) form a wall with a rectangular cross-section to surround the connecting portion (22) therein. Furthermore, the first notches (14) and the second notches (34) are correspondingly matched together to define multiple windows, whereby the signal terminals (23) are placed inside the windows for receiving the external video/audio signal wires (not shown). The housing (10) further has a plurality of apertures (18) defined therein, so that the sounds from the speakers (12) are able to pass out through the apertures (18).

Figure 3:
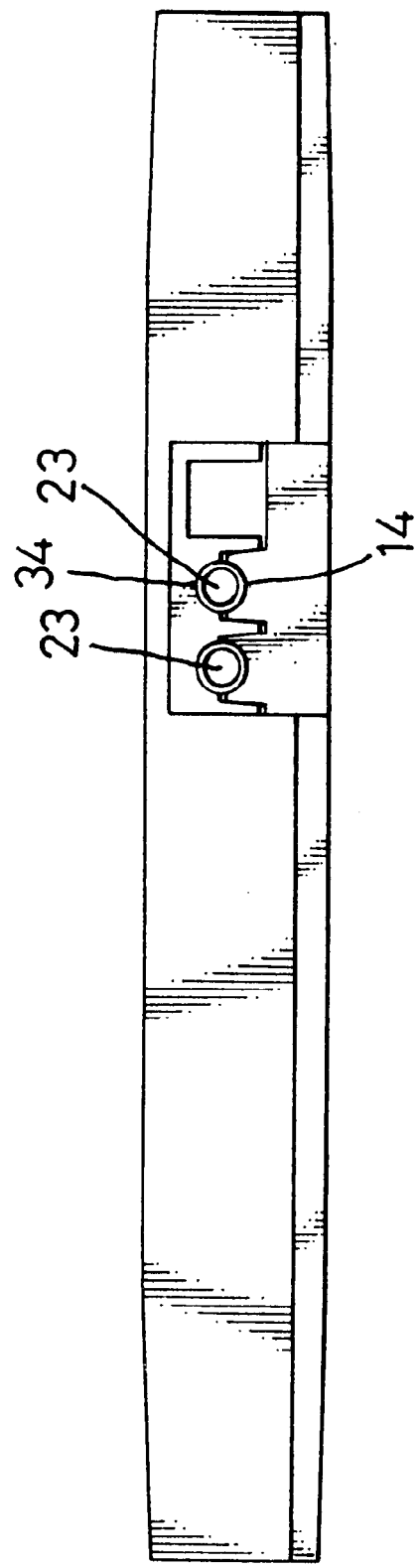
FIG. 3 is a bottom plan view of the video/audio module in accordance with the present invention.

With reference to FIG. 3 which shows the bottom plan view of FIG. 2, the signal terminals (23) are received inside the windows that are formed by the first notches (34) and the second notches (35) for receiving external video/audio signal wires.

Figure 4:
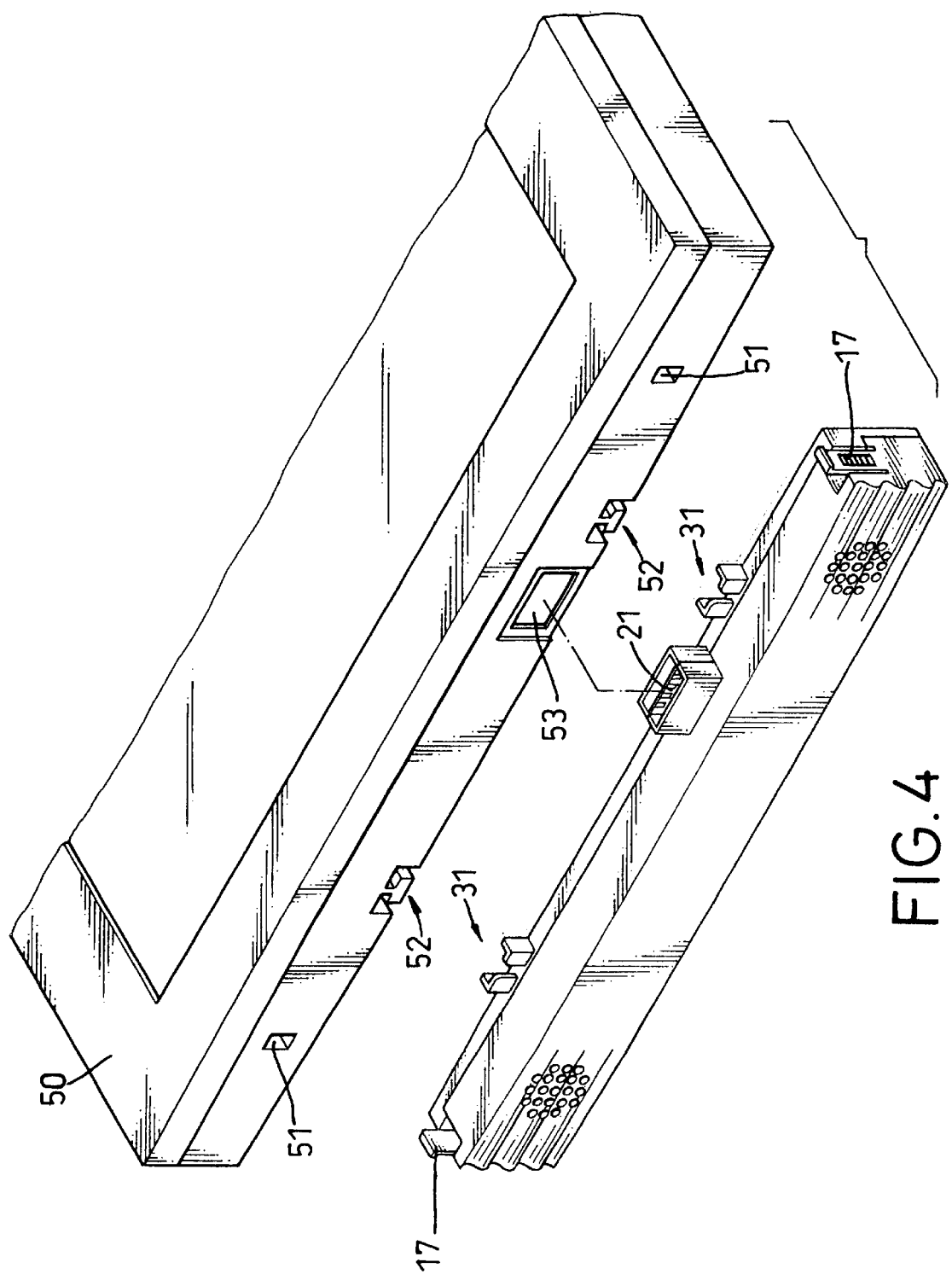
FIG. 4 shows how to equip the video/audio module of the present invention to a flat-panel display.

With reference to FIG. 4, it shows how to equip the video/audio module of the present invention to a flat-panel display, wherein an LCD monitor (50) is used as the flat-panel display for explanation hereinafter. The bottom of the LCD monitor (50) is defined with two holes (51) corresponding to the fasteners (17), and two mortises (52) corresponding to the tenons (31). The LCD monitor (50) further has a signal port (53) formed at the bottom thereof for receiving the wall composed by the first bulge (16) and the second bulge (36) when the module is equipped to the LCD monitor (50), wherein the connecting port (21) of the circuit board (20) is electrically contacted with a corresponding connecting port (not shown) of the LCD monitor (50).

Once the video/audio module is connected to the LCD monitor (50), the circuit module inside the monitor (50) can immediately detect the module such that they can communicate with each other, whereby the video and audio signals received by the module are able to be respectively displayed via the monitor and the speakers (12).

Figure 5:
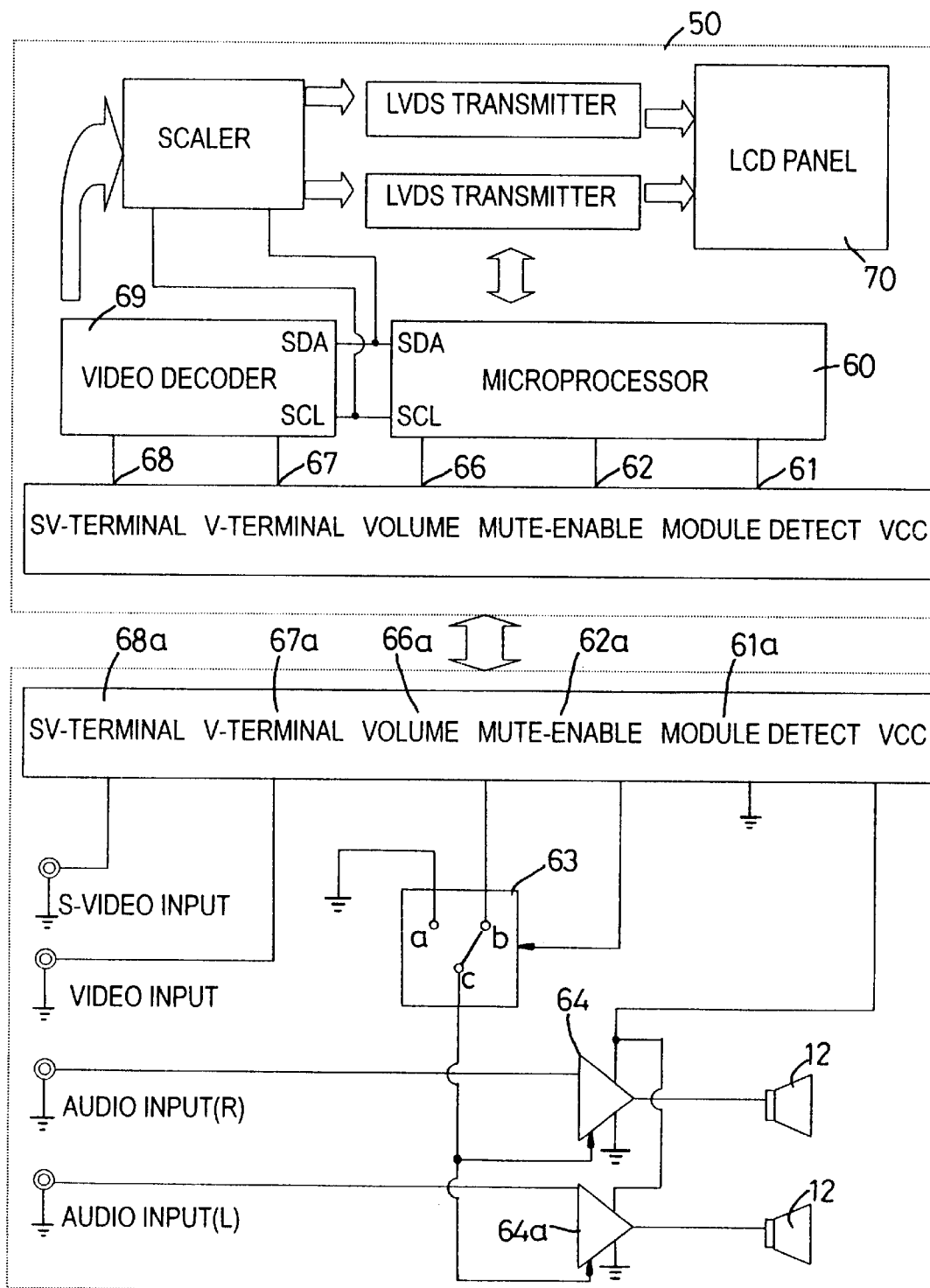
FIG. 5 is a circuit block diagram of the video/audio module of the present invention in connection with the monitor.

With reference to FIG. 5, a circuit block diagram shows the circuit module in the LCD monitor (50) is connected with the video/audio module of the present invention. When the connecting port (21) is connected to the signal port (53) of the monitor (50), a microprocessor (60) inside the monitor (50) detects that the voltage level of a module detector pin (61) is changed from high to low, and the microprocessor (60) is activated to function and presents an 'on screen display' (OSD) menu on the monitor (50). Meanwhile, two audio amplifiers (64)(64a) are powered from a power terminal (VCC), thus the two audio amplifiers (64)(64a) are able to respectively drive the speakers (12) to output sounds. A switch (63) in the video/audio module is controlled by a mute-enable pin (62)(62a), wherein the "b" and "c" contacts are normally in connection, so that the speakers (12) are able to output sounds. When a user wants to adjust the volume of the speakers (12), the user can adjust a volume button (not shown) of the monitor (50) to control the microprocessor (60), whereby the microprocessor (60) controls the gain of the audio amplifiers (64)(64a) via a volume pin (66)(66a) so as to adjust the volume.

Furthermore, the user can activate the mute function by pressing a mute button (not shown) of the monitor (50) thereby the microprocessor (60) controls the "a" and "c" contacts in the switch (63) to connect together by the mute-enable pin (62)(62a). Since the volume pin (66)(66a) connects to a ground, the gain of the audio amplifiers (64)(64a) is zero and the speakers (12) are disabled.

The audio/video module of the present invention can also receive the external video signals, such as the AV signal or S-video signal, via an AV terminal (67a) and an S-video terminal (68a). When the AV terminal (67a) or the S-video terminal (68a) receives the external video signals and the microprocessor (60) is activated to function, the external video signals are inputted into and processed by a video decoder (69) to determine which kind of video signal is inputted. The decoded video signals are further inputted into a scaler to adjust the resolution of the decoded video signals so as to agree with the resolution of the monitor (50). The video signals are then inputted into two low voltage differential signal (LVDS) transmitters for converting the specification of the video signals from a TTL standard into an LVDS standard, and finally the converted video signals are display by an LCD panel (70).

From the foregoing description, the video/audio module of the present invention has the simple positioning means (two fasteners) to achieve a secure and stable connection between itself and the monitor, and has an orientation means (two tenons) to provide a direction guiding. Further, since the electrical connection between the module and the monitor is achieved by the connecting port, which is in a form of finger connector, surrounded by a wall with a rectangular cross-section composed by two bulges, the signal connection is ensured to have a fine stability.

The invention may be varied in many ways by a skilled person in the art. Such variations are not to be regarded as a departure from the spirit and scope of the invention, and all such modifications are intended to be included within the scope of the following claims.

What is claimed is:

1. A video/audio module for a flat-panel display, the video/audio module comprising:
   a housing having a top plate and two side walls extending from two opposite ends of the top plate, wherein two fasteners are respectively formed on the two side walls for secure connection with the flat-panel display;
   a circuit board provided inside the housing and having a connecting port adapted to electrically connect to the flat-panel display, wherein the circuit board has signal terminals for receiving external video/audio signals and electrically connected with speakers arranged inside the housing; and
   a cover enclosing the housing.

2. The video/audio module as claimed in claim 1, wherein the cover has a top plate and has at least one tenon formed on the top plate adapted to connect to the flat-panel display.

3. The video/audio module as claimed in claim 1, wherein the two fasteners are formed in an L-shaped form.

4. The video/audio module as claimed in claim 2, wherein the two fasteners are formed in an L-shaped form.

5. The video/audio module as claimed in claim 1, wherein a rectangular opening is defined in the top plate of the housing, whereby the connecting port of the circuit board is able to protrude from the rectangular opening to connect with the flat-panel display.

6. The video/audio module as claimed in claim 4, wherein a rectangular opening is defined in the top plate of the housing, whereby the connecting port of the circuit board is able to protrude from the rectangular opening to connect with the flat-panel display.

7. The video/audio module as claimed in claim 5, wherein a first bulge with a U-shaped cross-section upwardly extends from the top plate of the housing and is formed along a flange of the rectangular opening, a second bulge with a U-shaped cross-section upwardly extends from the top plate of the cover, when the cover encloses the housing, the first bulge and the second bulge form a wall with a rectangular cross section to surround the connecting port of the circuit board.

8. The video/audio module as claimed in claim 6, wherein a first bulge with a U-shaped cross-section upwardly extends from the top plate of the housing and is formed along a flange of the rectangular opening, a second bulge with a U-shaped cross-section upwardly extends from the top plate of the cover, when the cover encloses the housing, the first bulge and the second bulge form a wall with a rectangular cross section to surround the connecting port of the circuit board.

9. The video/audio module as claimed in claim 2, wherein the at least one tenon is formed by two protrusions each with an L-shaped cross-section, and the two protrusions are arranged to form a substantially U-shaped wall.

10. The video/audio module as claimed in claim 4, wherein the at least one tenon is formed by two protrusions each with an L-shaped cross-section, and the two protrusions are arranged to form a substantially U-shaped wall.

11. The video/audio module as claimed in claim 6, wherein the at least one tenon is formed by two protrusions each with an L-shaped cross-section, and the two protrusions are arranged to form a substantially U-shaped wall.

12. The video/audio module as claimed in claim 8, wherein the at least one tenon is formed by two protrusions each with an L-shaped cross-section, and the two protrusions are arranged to form a substantially U-shaped wall.

13. The video/audio module as claimed in claim 1, wherein the connecting port of the circuit board has multiple metal contacts provided thereon so as to form a finger connector.

14. The video/audio module as claimed in claim 12, wherein the connecting port of the circuit board has multiple metal contacts provided thereon so as to form a finger connector.

* * * * *